(12) United States Patent
Ronca

(10) Patent No.: US 6,450,514 B1
(45) Date of Patent: Sep. 17, 2002

(54) DOLLY FOR MOVING LARGE SHEETS

(76) Inventor: Anthony Ronca, 27 Ferry Rd., Old Saybrook, CT (US) 06475

( * ) Notice: Subject to any disclaimer, the term of this patent is extended or adjusted under 35 U.S.C. 154(b) by 0 days.

(21) Appl. No.: 09/641,478

(22) Filed: Aug. 18, 2000

Related U.S. Application Data

(63) Continuation-in-part of application No. 09/121,139, filed on Jul. 23, 1998, now abandoned.

(51) Int. Cl.$^7$ ................................................. B62B 3/10
(52) U.S. Cl. ................................ 280/79.11; 280/47.35; 280/79.7; 269/17; 211/41.14
(58) Field of Search .......................... 280/47.34, 47.35, 280/79.11, 79.3, 79.4, 79.7; 211/20, 21, 41.14, 41.15; 269/17

(56) References Cited

U.S. PATENT DOCUMENTS

| | | | | |
|---|---|---|---|---|
| 1,330,891 A | * | 2/1920 | Merrill | 280/47.34 |
| 2,470,054 A | * | 5/1949 | Schildmeier | 280/47.34 |
| 2,681,233 A | * | 6/1954 | Smith | 280/79.7 |
| 3,003,788 A | * | 10/1961 | Grymer | 280/79.7 |
| 3,102,648 A | * | 9/1963 | Hughes | 280/47.29 |
| 3,669,464 A | * | 6/1972 | Linzmeier | 280/47.35 |
| 3,705,731 A | * | 12/1972 | Berchak | 280/79.11 |
| 3,744,812 A | * | 7/1973 | Langhausen | 280/79.11 |
| 4,360,211 A | * | 11/1982 | Blake | 280/79.7 |
| 4,488,733 A | * | 12/1984 | Hellsten | 280/47.34 |
| 4,930,966 A | * | 6/1990 | Chien | 269/17 |
| 5,009,406 A | * | 4/1991 | McDermott | 269/17 |
| 5,253,887 A | * | 10/1993 | Marenger | 280/79.7 |
| 5,871,219 A | * | 2/1999 | Elliott | 280/47.34 |

FOREIGN PATENT DOCUMENTS

| | | | |
|---|---|---|---|
| DE | 2020219 | * | 11/1971 |
| DE | 3139111 A1 | * | 5/1982 |
| DE | 3502194 A1 | * | 7/1986 |
| DE | 3604657 A1 | * | 8/1987 |
| JP | 406001353 A | * | 1/1994 |
| WO | WO 90/10566 | * | 9/1990 |

OTHER PUBLICATIONS

Arrow Star Company, Glen Head New York (1998) p. 46 from Merchandise Catalogue.*

* cited by examiner

Primary Examiner—Paul N. Dickson
Assistant Examiner—Ruth Ilan
(74) Attorney, Agent, or Firm—C. G. Nessler

(57) ABSTRACT

A dolly for transporting both circular and rectangular sheets includes of a base having an open rectangular frame a vertical stanchion for supporting the upper edges of angled sheets. The stanchion has surfaces for supporting a sheet, which surfaces lie along a particular vertical plane. The stanchion is removable from the base for easy transport. The lower edge of a circular sheet being transported extends into the frame opening, and beneath the plane of the top of the base, while the lower edge of a rectangular sheet does not extend below the plane of the top of the base. The vertical load of each kind of sheet is concentrated on the two spaced apart front and rear members having resilient material surfaces. The dolly has four swivel caster wheels. A sheet riding on the dolly lies within the vertical projection of a zone bounded by innermost points of contact which the swivel wheels make with the floor as they rotate about their swivel axes; more preferably within a sub-portion of the zone which is defined analogously by the outer circumferences of the wheels.

17 Claims, 5 Drawing Sheets

DOLLY FOR MOVING LARGE SHEETS

This application is a continuation in part of U.S. patent application Ser. No. 09/121,139, filed Jul. 23, 1998, now abandoned.

TECHNICAL FIELD

The present invention relates to dollies, or carts, adapted to transport large sheets of material across floors and the like.

BACKGROUND

It has long been a problem to move single large sheets of metal, glass, stone and ceramic about in manufacturing plants and in the field. As an example, a conference table may have a large stone or glass sheet top, for instance, a 5×10 foot rectanguloid or 6 foot diameter disk weighing 300 or more pounds. Typically, such a top rests on a detachable base, to facilitate transport. When such a large table top is be carried into an office building lobby, up an elevator, and through a finished office, care is needed to protect the top and things along the path. The same problems obtain when glaziers transport large sheets of glass any distance. As another example, in a fabrication shop, a sheet of steel or other material might need to be casually moved from one work station to another. Not only are such large sheet objects awkward to handle, but particularly in the field, it is important that the sheet be handled in a safe way which damages neither the sheet nor other things.

A common way to handle a large sheet is to have at least two or more workers manually carry the sheet. Other times, a conventional flat dolly is employed, even though the sheet tends to be unstable and prone to come off such a type unit. Lashing the sheet to the dolly is awkward and inconvenient.

Prior inventors have addressed the problem in various ways by designing special dollies. Many such dollies have "A" frames or other sloped structures mounted on their surface, to support the sheet. The angle at which the sheet is carried is fixed. The prior art dollies are often not suited for carrying round or oval sheets, as characterize many table tops. In general, the prior art A-frame type dollies are bulky and heavy; and, they are costly. They may be suited for certain factory settings. But, in the field it is inconvenient to transport such dollies due to their bulk and weight. The bottom line is that the dollies taught by the prior art tend to not be used because they are unsuitable for applications where a fragile environment, e.g., a finished office or living space, must be traversed.

Thus, there is a continuing need for a dolly which stably carries both rectangular and flat sheets, and which dolly is light, transportable, and economic to produce. And, experience shows that this may not be easy, because a large sheet mounted on a dolly can easily comprise an unstable combination.

SUMMARY

An object of the invention is to provide means for transporting both large rectangular and large circular sheet objects. A further object of the invention is that such means be light in weight, convenient to use, easy to transport, and economic to fabricate.

In accordance with the invention, a sheet to be transported is placed edgewise on the base of a rectangular frame dolly base having four wheels, preferably swivel caster wheels. The frame of the dolly base is formed of two lengthwise running side beams and two opposing end members; and, it has a central rectangular opening. A sheet being transported leans against the vertical surfaces of a stanchion comprised of spindles and a horizontal top bar. The stanchion is mounted offset from the longitudinal centerplane of the base. As a rectangular sheet is being carried, it rests along a plane defined by the top surfaces of the front and rear members. When a circular sheet is transported it is cradled within the space between the front and rear members, and its lower edge is at an elevation less than said plane.

For stability during transport, the sheet center of gravity lies within the vertical projection of a no-contact zone, as preferably do the lower and upper parts of a sheet which contacts respectively the base and the stanchion. The no-contact zone is a region defined by the innermost portions of circles of rotation of swivel caster wheels where they touch the floor and swivel around their pivot axes. The inner surfaces of the stanchion which contacts the sheet lie along a vertical plane. That vertical plane is located within bounds of the no-contact zone, called Zone Z herein. Likewise, on the opposing side of the base, the inside of the frame hole of the base is also located within the no-contact zone vertical projection, to desirably position the bottoms of circular sheets placed on the dolly. More preferably, the stanchion and interior of the base frame are located within a sub-portion of the Zone Z, which is called Zone Y. Zone Y is defined by the innermost portions of the circles of rotation of the outer circumferences of the swivel wheels. In the preferred invention, the sheet lies against the stanchion at an angle with the horizontal of 75–90 degrees, preferably 75–85 degrees, most preferably 80–85 degrees.

Preferably, there a retention bar sticking up from the base surface at said opposing side, within the no-contact zone bounds, to position the bottom edge of a rectangular sheet. The retention bar serves the same purpose as the interior of the base frame does for circular sheets; and, when the retention bar extends across the opening of the base frame, it is substitutional for the inner edge of the base frame in determining where a circular sheet bottom will rest. The top surfaces of the end members comprises a resilient frictional material, e.g., rubber underlain by wood. Since the sheet weight is concentrated at two spaced apart points, local deformation of the resilient surface helps stop sideways slipping of the sheet. More preferably, the stanchion, frame hole and retention bar components of the dolly are analogously positioned with respect to a smaller zone, called the no-wheel zone, which lies within the no-contact zone. The no-wheel zone is defined by the innermost circumferential points of the wheels themselves, as compared to where they contact the floor.

In further accord with the invention a second horizontal bar, which is vertically adjustable, runs between the spindles of the stanchion. This provides an adjustable support which is particularly useful for small circular sheets. Preferably, the stanchion is removable from the base, by having the spindles mounted in sockets, or clamped to the base. Alternatively, the stanchion is hinged to the base, so it can be folded flat along the top surface. These features facilitate transport of the dolly to the point of use.

The dolly of the invention is useful for stably transporting a variety of shapes of sheets and economic to construct. The dolly configuration minimizes chance for damage to the sheet edges or by bending fracture during use. And even while providing these advantages, the dolly is light weight, adapted to easy transport, and economically made.

The foregoing and other objects, features and advantages of the invention will become more apparent from the following description of the best mode of the invention and accompanying drawings.

DESCRIPTION

Figure 1:
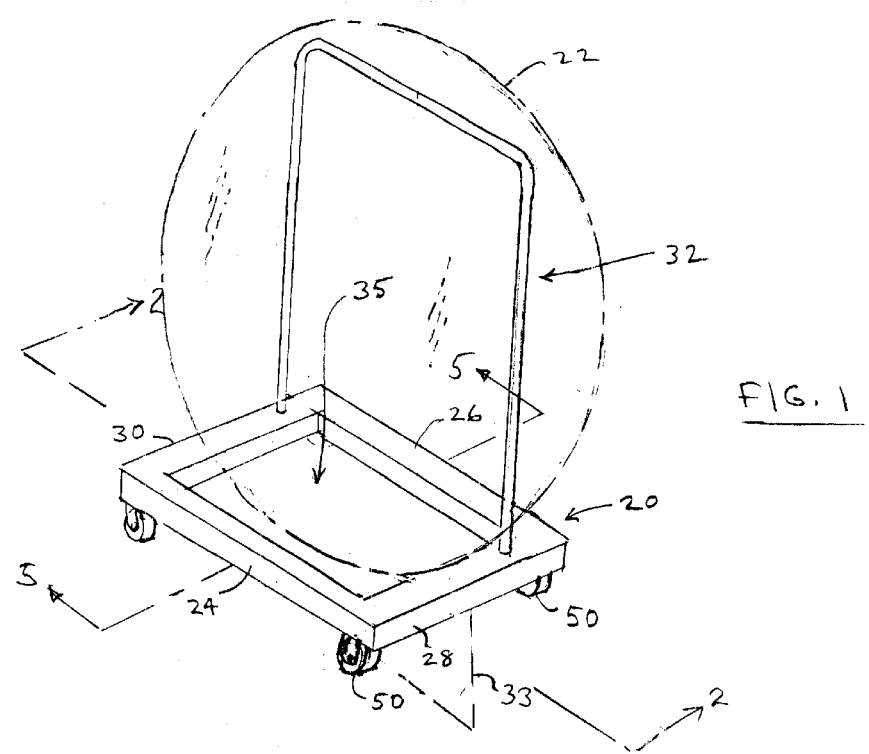
FIG. 1 is an isometric view of a dolly carrying a circular sheet shown in phantom.

The invention is described in terms of transporting large table tops made of stone or glass. As will be evident, it will be useful for transporting other kinds of sheets.

In the invention, a dolly has a base 20 and a detachable vertical stanchion 32. The term "dolly" as used herein comprehends a device having wheels or rollers, for transporting things. The stanchion 32 is offset from the dolly longitudinal centerplane 33, being mounted nearer to one side beam of the base. See FIG. 1 and 5. The dolly base 20 is in the shape of a rectangular frame having a center opening 35 being comprised of two opposing front and rear members 28, 30 and first side beam 26 and second side beam 24. Preferably the side beams and members are lightweight metal angle iron (See the cross section of FIG. 6), joined by welding. Pieces with solid rectangular cross section are shown for purpose of illustration.

Swivel casters wheels (wheels which swivel in offset fashion about a vertical axis) 50 are mounted near the four corners of the dolly underside. One pair of wheels lies along the length of the first side beam and a second pair along the length of the second side beam. They are symmetrically positioned on either side of the central lengthwise plane 33 of the base. See FIG. 5.

In the invention, a sheet being transported is placed in a critical location on the dolly, according to experiment. The location of the sheet on the dolly is such that the combination is stable (that is, not prone to tipping over), but the sheet and dolly combination is adapted to fit through narrow office spaces. Further, the sheet is not prone to falling off the dolly nor breaking due to bending stresses. This is achieved by carefully positioning the stanchion and the portions of the dolly which retain the base.

Figure 2:
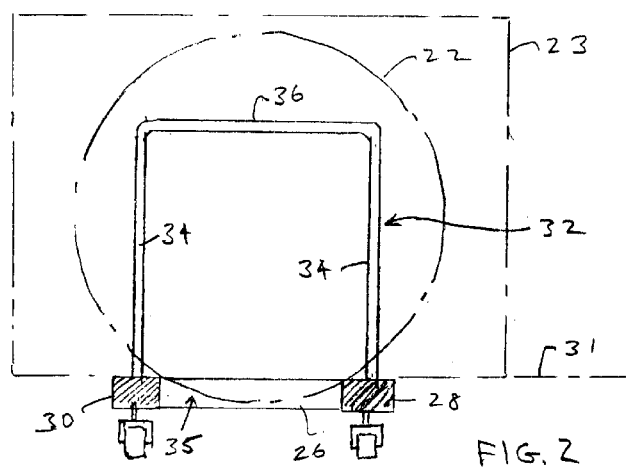
FIG. 2 is a cross sectional view through the dolly of FIG. 1, showing how the dolly differently carries rectangular and circular sheets.
Figure 3:
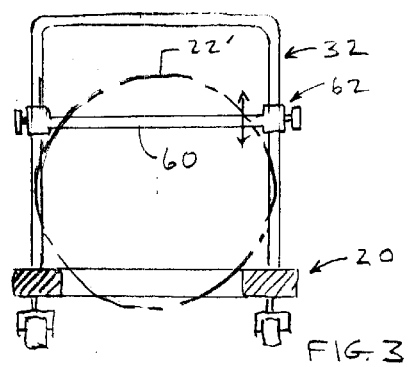
FIG. 3 is a view like FIG. 2, showing a dolly fitted with an adjustable horizontal bar and carrying a smaller circular sheet.
Figure 12:
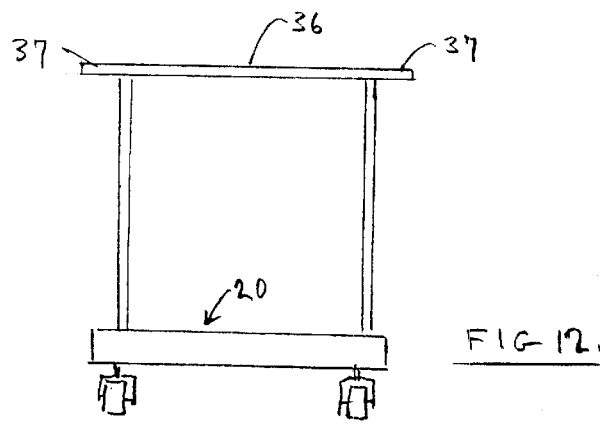
FIG. 12 is an elevation view much like that of FIG. 2 and 3, showing a stanchion having an horizontal bar with laterally extending portions.

As shown in FIG. 2, the stanchion 32 has two vertical spindles 34 by which it is attached to the top of the base. More spindles may be used. The upper ends of the stanchion spindles are connected by a horizontal bar 36. Preferably, the stanchion is made of pipe and has the shape of a almost-square bottom inverted U, as shown in FIG. 1–3. The bottom ends of the spindles 34 preferably placed removably into sockets or holes in the surface of the front and rear members. See FIG. 14. Alternately, they may be spaced closer together by placing them along side beam 26. The horizontal bar 36 of the stanchion is shaped to support a leaning sheet when it rests edgewise on the base, as shown for the phantom round sheet 22 in FIG. 1. See also FIG. 5. Optionally, the horizontal bar 36 is long enough so one or both ends 37 extend beyond the tops of the spindles, as shown in FIG. 12, to enable the ends 37 to be used as handgrips for convenient moving of the dolly.

Figures 4, 5:
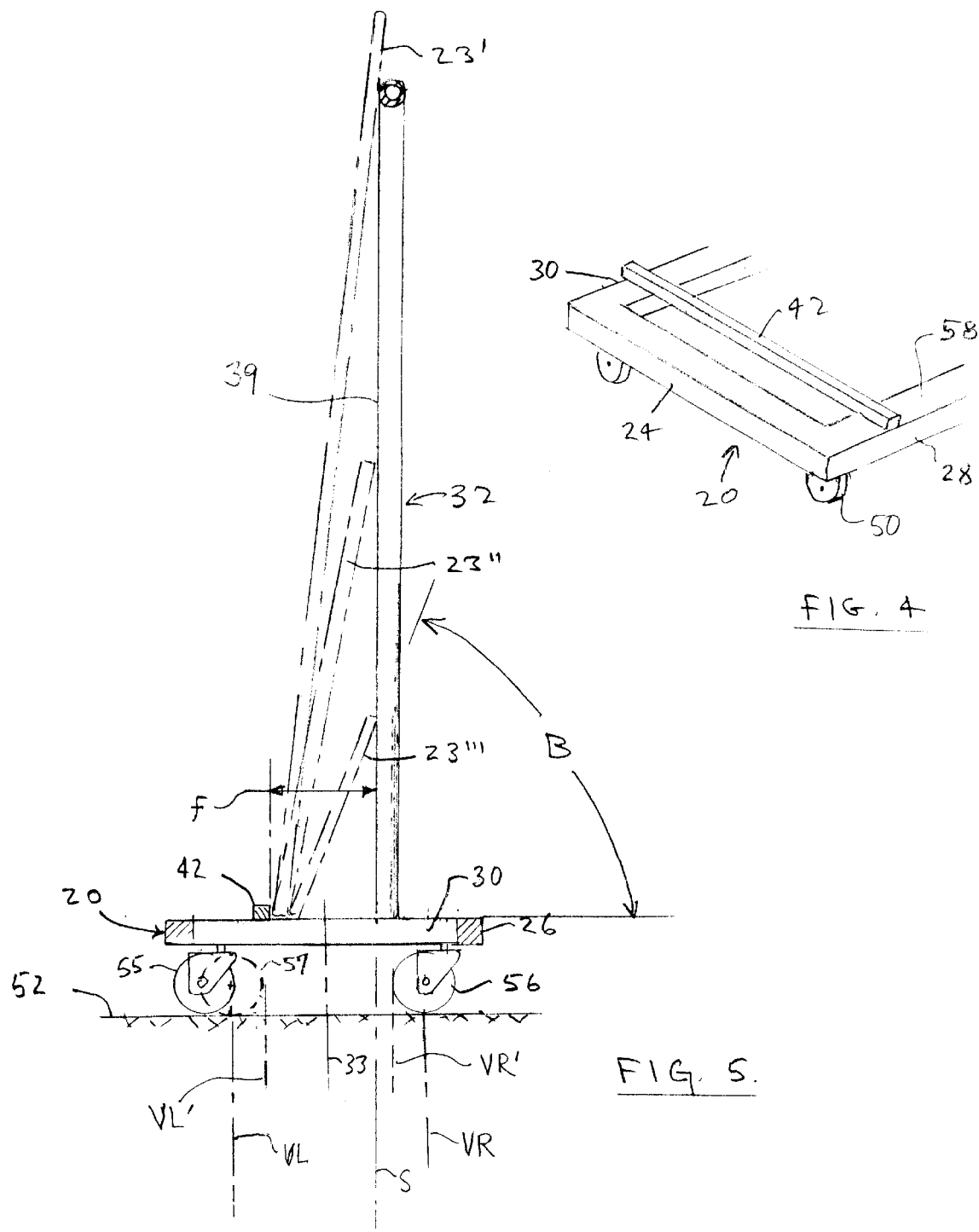
FIG. 4 shows how a retention bar extends from one side of the opening in the frame of the base.
FIG. 5 is a vertical mid-plane cross section end view of a dolly like that shown in FIG. 1, showing the position of the stanchion and retention bar relative to the wheels, and the angles at which different dimension sheets are carried.

With reference to vertical cross section end view of the dolly, shown in FIG. 5, the stanchion 32 is positioned and shaped so that the inward-facing surfaces 39 of the spindles and the horizontal bar (those surfaces which face toward the centerplane 33) lie along a vertical plane S, which plane is inboard of the line VR, more preferably inboard of line VR'. In FIG. 5 the two wheels which are near rear end member 30 are designated wheels 55, 56.

Figure 11:
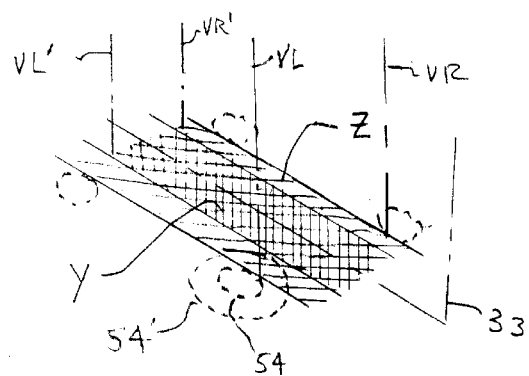
FIG. 11 is shows the shaded no-contact zone Z which lies between the circles of contact of the four wheels of a dolly.

The extreme left-right swivel positions of the typical wheels of the dolly, viewed from the front end and shown in FIG. 5, are illustrated by the actual wheel 56 and the phantom 57 of wheel 55. Wheel 56 is shown at its innermost position. As a wheel is swiveled about, it makes a circle of contact points with the floor on which the dolly rests. The circle of contact 54 of wheel 55 is depicted in FIG. 11, which is a perspective view of the floor 52 which underlies the dolly of FIG. 5. As shown in FIGS. 5 and 11, line VR runs vertically from the innermost point of the circle of contact which wheel 56 makes with the floor 52, as it swivels about its vertical axis.

Corresponding line VL relates to wheel 55 and how the bottoms of sheets are retained on the side of the dolly which is on the other side of the centerplane from the stanchion. As shown in FIG. 5 and FIG. 4, there is preferably a member projecting upward from the top surface 58 of the base, namely retention bar 42, proximate side beam 24 and on the opposite side of the base from that near which the stanchion is mounted. See FIG. 4. The retention bar limits lateral movement off the base of the bottom edge of any rectangular or circular sheet which rests on the surface of the base, as illustrated by FIG. 5.

Of course, circular sheets tend not to similarly slide laterally off the dolly, inasmuch as their bottom ends will project into the opening 35 of the frame of the base and engage side beam 24. Just as the stanchion vertical surfaces have been described to be positioned relative to the line VR, the inner surface of a retention bar 42 or of a side beam 24 lies at or inboard of line VL. In another embodiment (not shown) the retention bar 42 only runs the widths of the members 28, 30, and not across front side beam. In yet another embodiment, the side beam 24 is of a width which causes its innermost edge to define the opening 35 such that the bottom of a circular sheet is desirably located at or inboard of relative to line VL (i.e., Zone Z, as described below). See FIG. 13 and further discussion below.

With reference again to FIG. 11, the cross-hatched zone Z on the floor is referred to as the no-contact zone. Zone Z lies on either side of the centerplane 33 and is bounded by lines running along the base length, between the innermost points of the circles of contact, i.e., the locations of lines VL and VR. The space between the innermost surfaces of the retention bar and stanchion bar, shown in the dolly embodiment of FIG. 5 as the space "f", is smaller than the width of no-contact zone Z.

With reference to FIG. 11, there is also a Zone Y. Zone Y is a sub-portion of Zone Z. Zone Y is defined analogously to Zone Z, from lines VL' and VR', as can be seen from FIG. 5, according to the lines VL' and VR' which correspond with the innermost locations of the opposing outer circumferences of the wheels 50, as they swivel about the base. The circle 54', projected onto the floor, which the outer circumference of the fully-swiveled wheels will make, is illustrated in FIG. 11. Most preferably, the inner faces of the stanchion and retention bar will be positioned within the vertical projection of Zone Y, less preferably within the vertical projection of Zone Z, for enhanced stability of the dolly when carrying a sheet.

FIG. 1, 2 and 3 show how the dolly is suited to carrying a circular sheet 22, 22', both shown in phantom. The lower end of the sheet sets within the constraints of the front and rear members 28, 30 and the bottom edge extends beneath the plane 31 of the top surface of the dolly base, into the opening 35. As shown by FIG. 2, the lower edge of a phantom rectangular sheet 23, having a edge length greater than the member-to-member inside spacing between members 28, 30, rests on plane 31 when it is being transported, as it is supported by the top surfaces of the members.

FIG. 5 shows in end view how the lower edges of rectangular sheets 23', 23" and 23'" rest on the upper surface (plane 31) of the dolly, and how the lower edge is restrained from sliding laterally off the dolly surface by retention bar 42. The retention bar and/or edge of opening, are positioned so that sheets placed on the dolly lie at a desired angle B, which is critical for balance and stability of the dolly. The angle B may range from about 75 to virtually 90 degrees, depending on the sheet size and location of the bottom edge of the sheet within the region having the dimension f. Most preferably, a typical sheet will be inclined at an angle B from the floor of about 80–85 degrees. By so-defining and limiting the angle B, the dolly configuration dictates a sheet transport position which is stable. The center of gravity of the sheet rests within the projection of the no-contact zone Z, more preferably within no-wheel Zone Y. As the figures illustrate, preferably, the entirety of the sheet will lie within the projection of Zone Y and Z. Experiment has shown that this configuration is necessary is good downward force on the front and rear members, so the sheet bottom edge will not slip. Yet, at the same time the angle avoids undue bending stresses of the sheet which a too-inclined angle would produce in the absence of an angled surface as characterizes some prior art devices. Such stresses on fragile stone or glass sheets can lead to breaking. While the sheet may be positioned on the dolly so that it is nearly vertical (B 90 degrees), doing so is less preferable because there is s resultant lack of force between the sheet and the stanchion, making the sheet unstable on the dolly.

Figure 6:
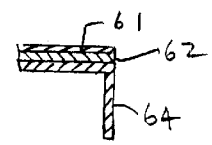
FIG. 6 is a cross section through an end member made of angle iron fitted with wood and rubber top layers.

The top surface 58 of the dolly, in particular the top surface of each end member 28, 30, is provided with a frictional or tractive surface finish which resists lateral sliding motion of the edge of a sheet being transported. Preferably the members are constructed so their surface is resiliently deformable. For example, rubber 61 or rug material is underlaid by wood 62 which is attached to the top surface of a steel angle member 64, as illustrated by FIG. 6. Thus, when any shape sheet is placed on the dolly, its bottom contacts the two spaced apart members. Thus the sheet load is concentrated, leading to at least slight deformation of the member surfaces. As a result there is better resistance of the sheet bottom to lateral motion than if the dolly surface were a continuous flat plane.

It is of course important that sheets, particularly stone sheets, be satisfactorily supported to avoid bending stresses. In the invention, weight- and cost-increasing sloped surface members (e.g., an A-frame) are avoided, since the particular objective of supporting is accomplished by the stanchion, retention bar and center opening combination. As described above, the horizontal bar 36 of the stanchion provides support for the upper end of large sheets. For smaller rectangular sheets, the stanchion spindles support the upper edge, as indicated for sheets 23' and 23'" in FIG. 5. Circular sheets which are of such diameter that they do not reach the elevation of the horizontal bar will have unfavorable contact points with the spindles, from the standpoint of stresses applied to the sheet should the dolly go across bumps and the like. Therefore, as shown in FIG. 3, preferably an adjustable position bar 60 runs between the spindles. The bar has vertically slidable collars and clamps at each end where it mounts on the spindles.

The stanchion spindles may be welded to the top of the base. But preferably the stanchion is detachable for transport. Preferably, it mounts in sockets and is removable, as mentioned, to enable disassembly of the dolly. This construction facilitates transport of the dolly from job site to job site; enables different size and shape stanchions to be used; and, enables the dolly base to be used by itself.

Figure 8:
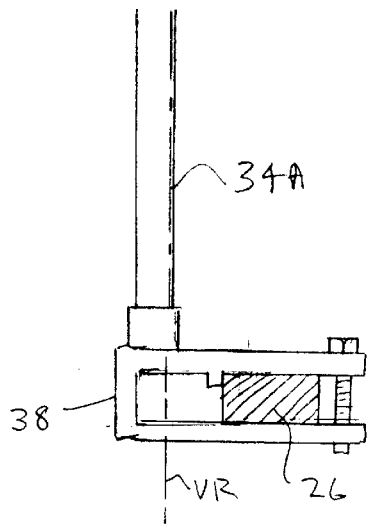
FIG. 8 is a detail of the stanchion and clamp of FIG. 7.
Figure 7:
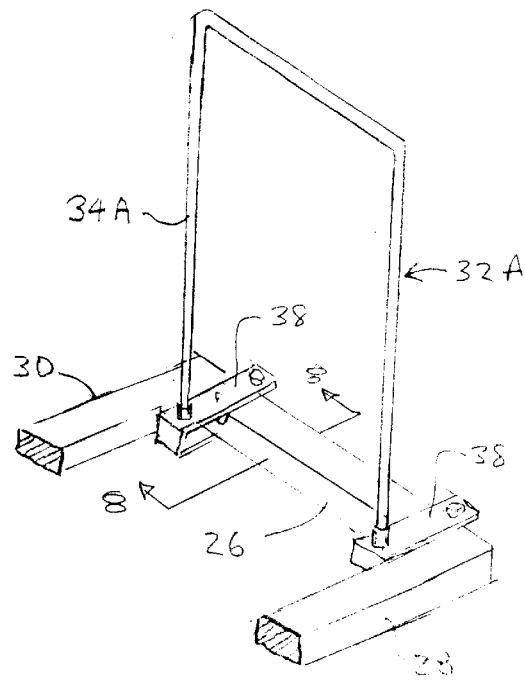
FIG. 7 shows a stanchion which removably clamps onto a side beam.
Figure 14:
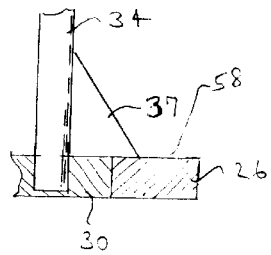
FIG. 14 is a detail vertical cross section of the corner of the base of a dolly, along the lines of the view in FIG. 5, showing how a detachable spindle inserts into a socket, and how a gusset plate extends rearwardly.
Figure 15:
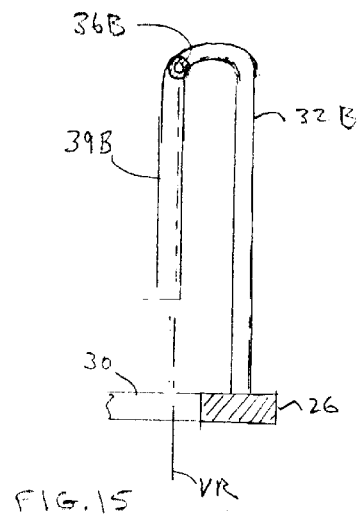
FIG. 15 is a view like FIG. 14, showing an alternative embodiment stanchion.

FIGS. 14 and FIG. 15 detail further spindle embodiments, showing a portion of the corner/end of a dolly, analogous to the view shown in FIG. 5. In FIG. 14, the lower end of spindle 34 sets in a socket in the side beam 30. A gusset plate 37, welded to the spindle, extends rearwardly to contact the surface 58 of the base, providing further strength. In another embodiment, the lower ends of spindles 34A of stanchion 32A are joined to clamps 38 which are detachably fastened to side beam 26. See FIG. 7 and 8. In these embodiments, the design of the stanchion is such that, when detached from the dolly, it can be easily transported or stored with the dolly in confined places, compared to the A-frame dollies of the prior art. In still another embodiment, the spindle 32B extends upwardly from the first side beam 26, outside the no-contact zone. See FIG. 15. It then loops downwardly within the no-contact zone, to provide the vertical surface 39B against which the sheets may rest. All these alternative embodiments indicate that the critical inside surface of the stanchion for sheet contact is (a) vertical and (b) within Zone Z, preferably Zone Y, even though other parts of the stanchion which are not adapted to contact a sheet may be outside the Zones.

Figure 9:
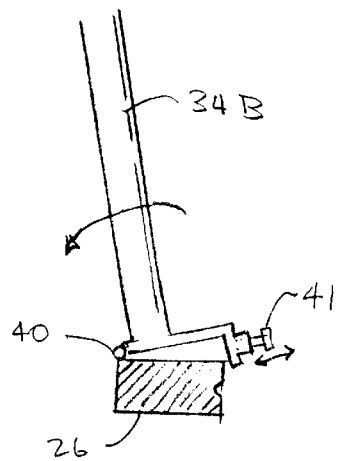
FIG. 9 shows a portion of a stanchion which hinged attaches by hinges to the top of the base of a dolly.
Figure 10:
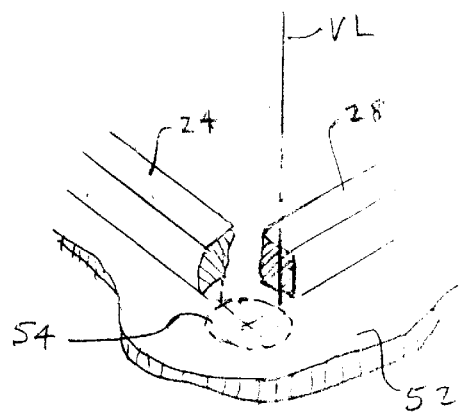
FIG. 10 is a cut-away of the corner of a dolly showing the circle of contact which a swivel caster wheel makes with the floor.

In another alternative embodiment, as shown in FIG. 9, the stanchion spindles 34B are attached to side beam 26 by means of hinges 40. Thus, the stanchion is able to rotate, as indicated by the arrow in FIG. 9, to fold and lie flat with the surface of the dolly, for easy transport. Detent pins 41 or the like used to keep the stanchion in its vertical use position. Another locking device, not shown, is used to keep the stanchion in its rest or transport position.

In use, a sheet is manually placed on the dolly, whereupon its ends will likely extend lengthwise beyond its ends, as illustrated by FIG. 2. One or two workmen then grasp one or both ends of the sheet (or the lateral extension of the top of the stanchion when they are present) and move the sheet and dolly together laterally. The weight of the sheet keeps it in contact with the dolly during movement. Lashing of the sheet to the stanchion may be used to provide additional security.

In an example of the dolly of FIG. 5, the stanchion is made of one inch steel pipe, has an inverted flat bottom U-shape, and rises to a height of about 36 inch above the top surface of the dolly. The dolly frame has an overall width of about 18 inch and overall length of about 30 inch. The dimension f of the effective use surface of the top of the dolly, which is the spacing between the inside of the retention bar and the inside of the stanchion spindles, is about 6 inch. Thus, the stanchion is set about 6 inch inboard of the outer edge of the side beam 26. The spacing between the stanchion spindles is about 27 inch. The opening of the frame of the base is 24 inch long and 14–15 inch wide. The swivel caster wheels are about 4 inch diameter. Such a dolly will typically be used for rectangular sheets having a width (bottom edge to upper edge dimension when laid on the dolly) of up to 72 inch, and for circular sheets of up to about 72 inch diameter. Other dimensions of dolly will of course be useful, and the foregoing should not be considered restrictive.

Figure 13:
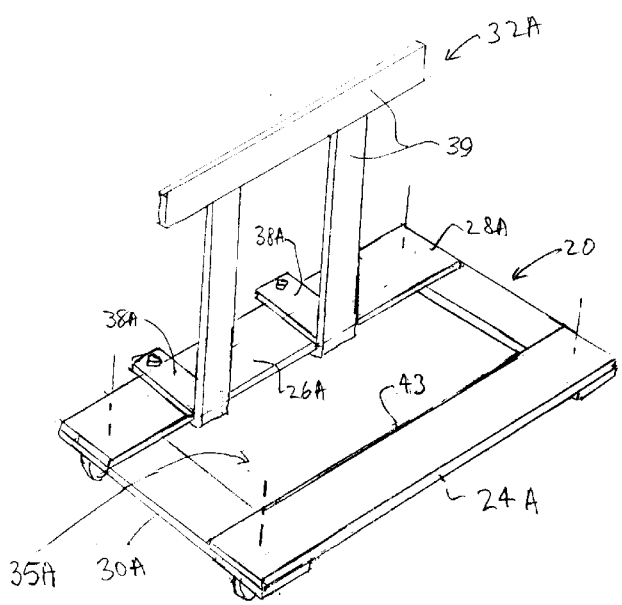
FIG. 13 is a perspective view of an embodiment of a dolly having relatively wide base beams and members and a detachable stanchion.
Figure 16:
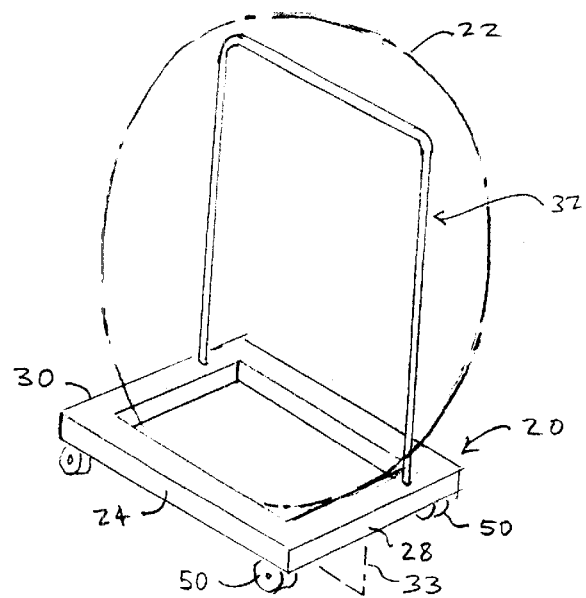
FIG. 16 shows how a circular sheet resting on the dolly is retained on by the second side beam.

Another example of the invention is shown in FIG. 13. The base 20 is comprised of relatively wide composite or wood boards. The stanchion 32A is attached to the base by clamps 38A. The side beams 28A, 30A of the base underlap the first and second side beams 26A, 24A, in contrast to conventional dolly construction. A circular sheet put ont he dolly will slip into the opening 35A of the base. The second side beam 24A is of the appropriate width and thickness dimension, such that its inner edge 43 serves functionally as a retention bar, for circular and rectangular sheets, to confine any movement of sheet lower ends to the no-contact zone. FIG. 16 shows how sheet 22 is retained by the second side beam 24A, in the same way as the sheet was shown to be retained by the retention bar in FIG. 5. The vertical surfaces 39A of the stanchion 32A and the inner edge 43 of the second side beam 24A are appropriately positioned at or within the edges of Zone Z or Zone Y, according to the choice of the designer, consistent with the previous description.

Another feature of the dolly is that it can be used for transporting articles other than sheets. When the stanchion is removed, it can be used as a simple dolly. With the stanchion in place, tubing or lengths of lumber, and other things, can be placed on the dolly so they may or may not rest against the stanchion. The stanchion can be conveniently grabbed by the user to move the dolly. Not only is this convenient, but it avoids putting a lateral force on the load which could tend to move the load off the top of the dolly.

Although only the preferred embodiment has been described with some alternatives, it will be understood that further changes in form and detail may be made without departing from the spirit and scope of the claimed invention.

I claim:

1. A dolly, for transporting a large rectangular or circular sheet, wherein the sheet rests edgewise on a surface of a dolly base and leans against a structure extending vertically from the base, which comprises:

a base having a first side beam and an opposing second side beam running along the length of the dolly, a first end member and an opposing second end member, the side beams and members joined together as a rectangular frame having an opening in the center thereof;

four swivel caster wheels attached to the bottom of the base, one each proximate a corner of the rectangular frame; a first pair of said wheels attached near the opposing lengthwise ends of the first side beam, and a second pair of said wheels attached near the opposing lengthwise ends of the second side beam, the wheel pairs lying on opposing sides of the center lengthwise vertical plane of the base; and, a stanchion, attached to and extending upwardly from the base at a location which is offset from said center lengthwise vertical plane in the direction of the first side beam, the stanchion having portions lying along one vertical plane, which portions are adapted to contact and laterally support a sheet resting edgewise on the top of the base and leaning against the stanchion; and, means for limiting movement, transverse to the length the base, of the bottom edge of a sheet placed edgewise on the base and leaning against said stanchion portions;

wherein, when a rectangular sheet is placed edgewise on the top of the base, the bottom edge thereof rests on said opposing end members so the bottom edge lies along a first horizontal plane; and, wherein, when a circular sheet is placed on the base it rests edgewise on said opposing end members and the lowermost edge of the circular sheet extends below said first horizontal plane and into said opening in the center of the frame of the base;

wherein, when the wheels of the dolly rest on a horizontal floor, each said wheel is adapted to rotate about a wheel vertical axis and thereby make multiple points of contact, lying along a circular path, with the floor; wherein, the innermost edges of said circular paths of said four wheels define the outer boundaries of a no-contact zone Z on the floor beneath the base, the zone Z generally centered on said lengthwise center plane;

wherein all said vertical portions of the stanchion, which are adapted to contact and support said sheet, lie along a first vertical plane which runs parallel to said first side beam and within the upward projection of said no-contact zone Z; and wherein said means for limiting movement of the bottom edge of the sheet lies along a second lengthwise vertical plane running through said no-contact zone, which second vertical plane is offset from said center lengthwise vertical plane in the direction of the second side beam.

2. The dolly of claim 1 wherein said first lengthwise vertical plane, along which all said vertical portions of the stanchion lie, is within a sub-portion Y of said no-contact zone, the outer edges of which sub-portion are defined by the innermost points reached by the outer circumferences of said wheels as each wheel rotates about its respective vertical axis.

3. The dolly of claim 1 wherein said means for limiting movement comprises the second side beam.

4. The dolly of claim 3 wherein said second lengthwise vertical plane is within a sub-portion Y of said no-contact zone, the outer edges of which sub-portion are defined by the innermost points reached by the outer circumferences of said wheels as each wheel rotates about its respective vertical axis.

5. The dolly of claim 1 wherein said means for limiting movement comprises a retention bar running lengthwise along, and projecting upward from, the top surface of the dolly.

6. The dolly of claim 5, wherein the retention bar runs the whole length of the base and across said opening, to limit transverse motion of both rectangular and circular sheets placed edgewise on the dolly.

7. The dolly of claim 1 wherein the stanchion comprises two spaced apart vertical spindles running upwardly from the base and a first horizontal bar connecting the upper ends of the vertical spindles.

8. The dolly of claim 7 further comprising a second horizontal bar running between the vertical spindles, adjustably positionable along the vertical length of the spindles, which second horizontal bar is one of said stanchion portions adapted to contact and laterally support a sheet.

9. The dolly of claim 7 wherein said first horizontal bar extends laterally beyond the points of connection of the bar with each spindle.

10. The dolly of claim 1 wherein the base has a top surface comprised of material which resists sliding of the edge of a sheet which contacts the base top.

11. The dolly of claim 10 wherein said material is resiliently deformable.

12. The dolly of claim 10 wherein said material is comprised of a layer of wood overlaid by a layer of rubber.

13. The dolly of claim 1 wherein the base has sockets; the stanchion having vertical members removably inserted into the sockets, so the stanchion may be detached from the base when the dolly is transported to a point of use.

14. The dolly of claim 13 wherein the stanchion is comprised of a bent U-shape tube.

15. The dolly of claim 1 wherein the stanchion comprises two or more vertically extending spindles, each spindle having releasable clamps which permit removal of the stanchion from the base, and reattachment to the stanchion to the base.

16. The dolly of claim 1 in combination with a circular sheet of material; wherein the second side beam has an innermost edge which in part defines said opening in the frame of the base, to limit said transverse movement; said edge lying along a second lengthwise vertical plane which runs parallel to said first side beam within the upward projection of said no-contact zone; said circular sheet resting on top of the base with the upper end thereof leaning against one or more of said vertical portions of the stanchion and the lower end thereof positioned at the location of said innermost edge of the second side beam; whereby, the sheet lies at an angle of 75–85 degrees from the horizontal.

17. The dolly of claim 3, wherein the second side beam overlaps said opposing end members; the second side beam having a thickness sufficient to provide an edge which limits said transverse movement of a rectangular sheet which rests on the opposing end members and leans against said stanchion.

* * * * *